United States Patent
Suzuki et al.

[11] Patent Number: 6,133,655
[45] Date of Patent: *Oct. 17, 2000

[54] CLAW-POLE STEPPING MOTOR WITH ROTOR INCLUDING VIBRATION REDUCING MAGNET

[75] Inventors: Yuzuru Suzuki; Sakae Fujitani; Takashi Ishii, all of Shizuoka-ken, Japan

[73] Assignee: Minebea Co., Ltd., Nagano-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/969,656

[22] Filed: Nov. 13, 1997

[30] Foreign Application Priority Data

Nov. 13, 1996 [JP] Japan ..................... 8-301511

[51] Int. Cl.[7] ................ H02K 21/14; H02K 1/27
[52] U.S. Cl. .................. 310/51; 310/156; 310/257
[58] Field of Search ................ 310/67 R, 683, 310/49 R, 156, 57, 257, 40 MN; 360/99.02, 99.04, 99.05, 99.08

[56] References Cited

U.S. PATENT DOCUMENTS

| | | | |
|---|---|---|---|
| 4,363,984 | 12/1982 | Torii et al. | 310/156 |
| 4,570,093 | 2/1986 | Morii et al. | 310/46 |
| 4,782,255 | 11/1988 | Oosaka et al. | 310/68 R |
| 4,818,907 | 4/1989 | Shirotori | 310/67 R |
| 4,851,731 | 7/1989 | Saotome et al. | 310/258 |
| 5,408,153 | 4/1995 | Imai et al. | 310/68 B |

FOREIGN PATENT DOCUMENTS

| | | | |
|---|---|---|---|
| 4-054842 | 2/1992 | Japan | 310/67 R |
| 4-172956 | 6/1992 | Japan | 310/67 R |

*Primary Examiner*—Karl Tamai
*Attorney, Agent, or Firm*—Staas & Halsey

[57] ABSTRACT

A claw-pole stepping motor with rotor, including a vibration reducing magnet. Vibration in the axial direction is suppressed by having a correction force, which overcomes a force produced by a vertical motion caused when the rotor is pulse-driven, and keeps the rotor attracted to one side. The corrective force is generated between an index generating magnetized portion in a lower area of the rotor and a soft magnetic material base. Magnetic flux leakage produced by the excitation of the stator coils of the motor is suppressed by providing a shield ring made of a magnetic material on an inner side of the rotor magnet, which minimizes the magnetic flux flowing from the coils to the revolving shaft, and noises on the recording and reproducing head are thereby greatly reduced.

11 Claims, 6 Drawing Sheets

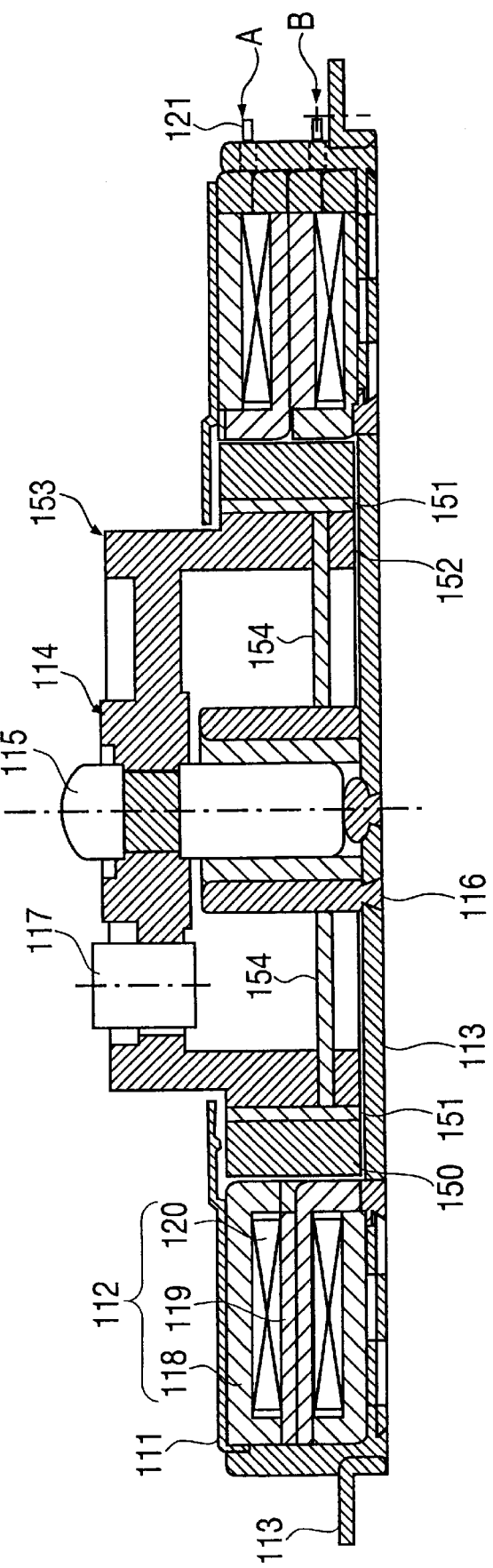

CLAW-POLE STEPPING MOTOR WITH ROTOR INCLUDING VIBRATION REDUCING MAGNET

BACKGROUND OF THE INVENTION

1. Field of the Invention

The present invention relates to a structure of a claw-pole stepping motor with rotor including a vibration reducing magnet to be used as the spindle motor for information storage apparatuses represented by FDD, HDD, CD-ROM, MO, MD, and the like.

2. Description of the Related Art

As the spindle motors for storage apparatuses, three phase brushless DC motors have so far been used from the point of view of the performances required of them. However, it has become difficult for the motors to meet the recent demands for lower prices, and therefore studies have begun on the use of claw-pole stepping motors as lower cost substitutes. Since the motor of this type is a synchronous motor, the motor control can be executed in the open-loop system instead of the previously practiced closed-loop system and, therefore, the control circuitry can be greatly simplified.

FIG. 7 is a sectional view of a conventional outer rotor type stepping motor 7, the structure of which will be described below. The stepping motor 7 is installed on a base plate 10. The stepping motor has two stator yokes 11 and 12 disposed on the base plate 10 one above the other. Within the stator yokes 11 and 12, there are disposed stator coils 13 and 14, respectively, and the interior of the stator yokes 11 and 12 is shaped into a cylindrical form. In the cylindrical space, there is disposed a bearing 17 upright from the base plate 10 and a revolving shaft 18 is rotatably borne by the bearing 17. The bottom end of the bearing 17 is rotatably supported by a thrust bearing 19 on the base plate 10.

On the outer side walls of the stator yokes 11 and 12, there are formed pole teeth 15 and 16. On the top end of the revolving shaft 18, there is mounted a cup-shaped rotor 20, and the rotor 20 has rotor magnets 21 fixed at portions thereof opposing the pole teeth 15 and 16. At the upper portion of the rotor 20, i.e., at the bottom portion of the cup shape, a chucking mechanism 8 is formed to retain the chucking hub of a disk. Reference numeral 22 denotes a pin to be fitted into a hole in the hub of a disk 5 (see FIG. 1a)

As to the positional relationship of the stator coils 13 and 14 and the stator yokes 11 and 12 with the rotor magnets 21 of the claw-pole stepping motor, the stator A and the stator B are disposed one above the other as shown in FIG. 7 and they are excited alternately. By the alternate excitation of the stator A and stator B, there arises a vertical motion as well as a revolving motion of the rotor 20. When the stator A is excited, the rotor magnets 21 receive a force pulling them as a whole upward in the axial direction as well as a rotating force and, when the stator B is excited in the next excitation pulse, the rotor magnets 21 receive a force pulling them downward in the axial direction as well as a rotating force. Namely, by the application of the pulses, the rotor 20 is caused to move up and down in the axial direction as well as to rotate.

The vertical movement becomes a vibration at higher pulse rates as the revolution of the motor increases. When the motor is used as the spindle motor of an information recording disk, the vibration causes surface deviation and also produces uneven rotation. Further, since there are stator coils 13 and 14 within the stator A and stator B and these coils are formed in a solenoidal form around the shaft, a great flux leakage in the axial direction is produced around the revolving shaft by the coil excitation. The flux leakage is superposed as a noise on the output of the recording and reproducing head and causes a deterioration in the S/N ratio of the signal.

The present invention has been made under the above described situation and provides a rotor structure whereby the vibration of the revolving shaft in the axial direction of the claw-pole stepping motor as well as the flux leakage are suppressed.

SUMMARY OF THE INVENTION

A device to suppress occurrence of an uneven rotation in a claw-pole stepping motor and obtain a smooth motion thereof proposed in Japanese Patent Application No. Toku Gan Hei 7-197970, i.e., a device in which smooth and stabilized rotation is obtained with uneven rotation suppressed by adjusting the phases of the stator A and stator B. If there is present any imbalance between the rotor and the stator, the rotor is caused to repeat the movements in the axial direction by the switched excitation of the coils and produce a vibration in the axial direction. The thus produced vibration eventually increases the surface deviation and deteriorates the dynamic characteristic. Therefore, a magnet for attracting the magnetic recording disk disposed on the magnetic recording disk side attracting face of the rotor and a magnetization for attracting the rotor, also serving as an index generating magnetized portion, was provided on the other end face of the rotor, to thereby suppress the movements of the rotor in the axial direction.

Further, the rotor is provided with a shield ring, also serving as the back yoke for the field magnets and the index generating magnetized portion, to thereby prevent the flux leakage produced by the stator coil excitation from concentrating in the revolving shaft and reduce the flux leakage to the outside of the motor. By constructing the rotor as described above, it has become possible to use the claw-pole stepping motor as the spindle motor, which has until this time been impossible. Further, by forming the field magnet of the rotor with a high polymer material containing magnetic powder, the so-called plastic magnet, the same material as that of the magnet for attracting the magnetic recording disk and the index generating magnetized portion, the rotor can be integrally formed by a mold with the revolving shaft inserted therein to achieve cost reduction.

BRIEF DESCRIPTION OF THE DRAWINGS

FIG. 2 is a cross sectional view of a spindle motor.

DESCRIPTION OF THE PREFERRED EMBODIMENTS

Figure 1A:
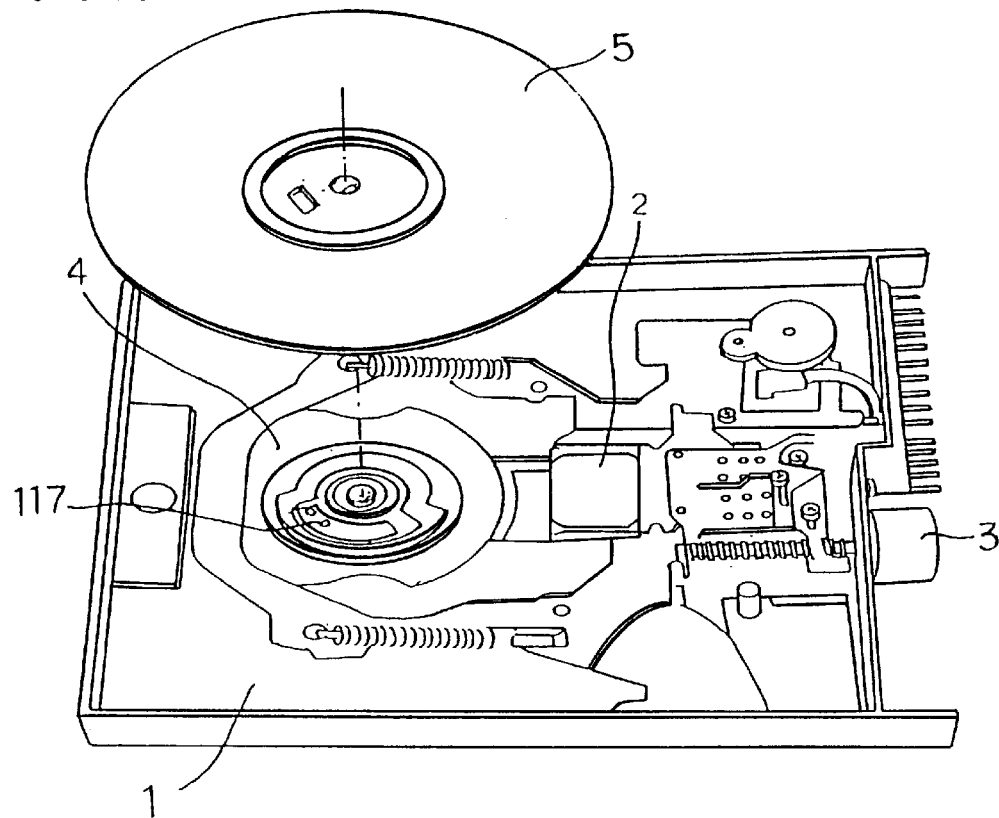
FIGS. 1a and 1b are perspective views of a magnetic disk driver.
Figure 1B:
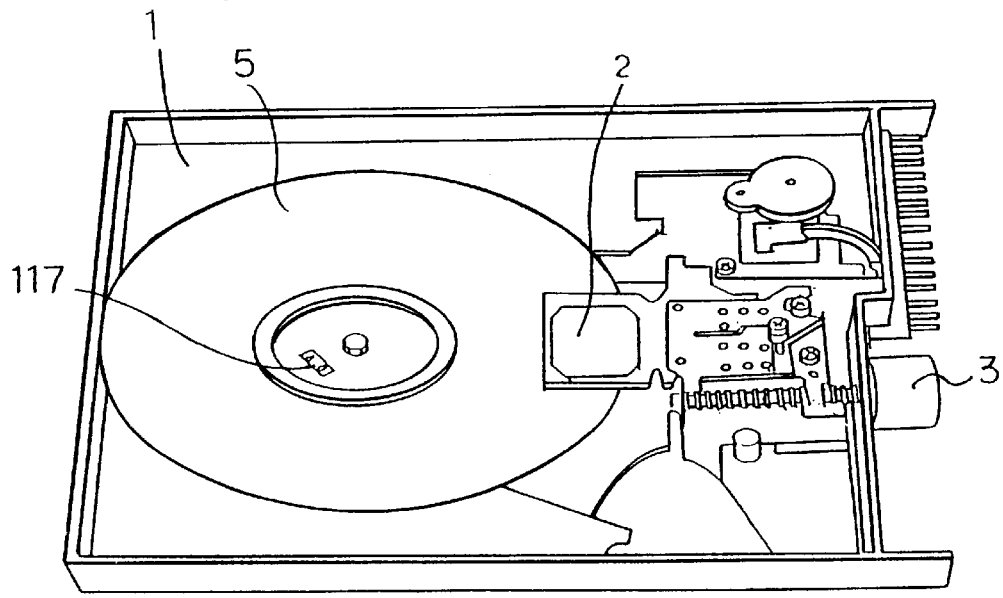

An embodiment of the invention will be described below with reference to the accompanying drawings. FIGS. 1(a)

and 1(b) are perspective views showing configurations of an FDD according to the present invention. Reference numeral 5 denotes a magnetic recording disk (floppy disk). There are disposed a spindle motor 4, a magnetic head 2, and a head actuator 3 with a frame 1 taken as a reference. The magnetic recording disk 5 is mounted on the spindle motor 4 and both sides of the magnetic recording disk 5 are inserted between magnetic heads for recording and reproduction. The magnetic head 2, at this time, is allowed by the head actuator 3 to scan the face of the magnetic recording disk 5 from an inner circumference track to an outer circumference track.

FIG. 2 is a longitudinal sectional view showing the structure of the spindle motor 4 shown in FIG. 1A. On a base 113 made of a soft magnetic material, there are two sets of pancake-formed stator assemblies 112, each thereof being constituted of a stator yoke A 118 and a stator yoke B 119 made of a soft magnetic material, having pole teeth provided on the inner circumferential face, and having a coil 120 which act to excite the stepping motor, sandwiched in between, disposed concentrically with a bearing 116 supporting a revolving shaft 115 as the center of rotation of a rotor assembly 114. The stator yokes 118 and 119; and are fixed by molding using a high polymer material or the like. Reference numeral 121 denotes a terminal of the coil 120. On the other hand, the rotor assembly 114, integrated with the revolving shaft 115 in the center by a plastic magnet, is provided with field magnets 150 on the outer circumferential face and a magnetized portion 153 for attracting the magnetic recording disk 5 shown in FIG. 1A on the top end face and a magnetized portion 152 for index generation on the opposite end face, and the same are fitted to the bearing 116. There is a rotor position sensor under the magnetized portion 152. But this structure is well known, so it is not shown in the drawings.

By virtue of the above described structure, the rotor assembly 114 attracts the base 113 with the index generating magnetized portion 152 to thereby suppress the vibration in the axial direction due to the coil magnetization. Here, at this time, a drive pin 117 for driving the disk is fixedly embedded in the face of the rotor assembly 114 attracting the magnetic recording disk 5. Then, a shield plate 111 composed of a soft magnetic plate is fixedly put on the stator assembly 112 and fixed to the frame 1 with screws passing through setting holes made in the base 113. Thereby, leakage of the magnetic flux from the space between the stators A and B and the field magnets 150 is greatly suppressed and its adverse effect on the information recording disk 5 is greatly reduced.

Figure 3A:
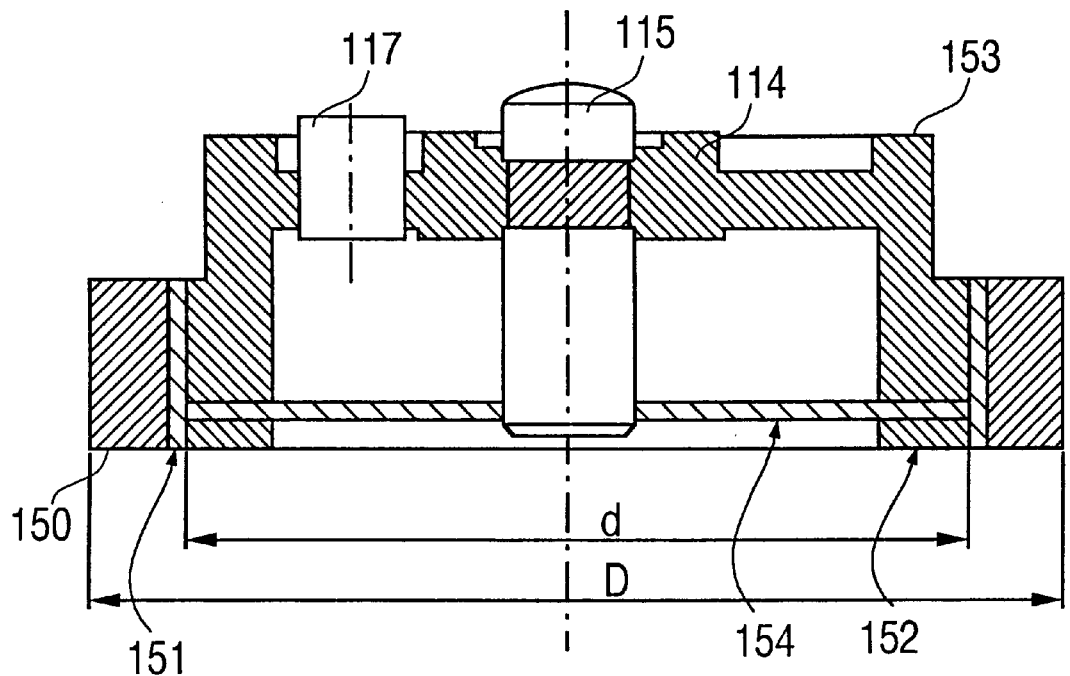
FIG. 3A is a cross sectional view of the rotor assembly of the present invention.
Figure 3B:
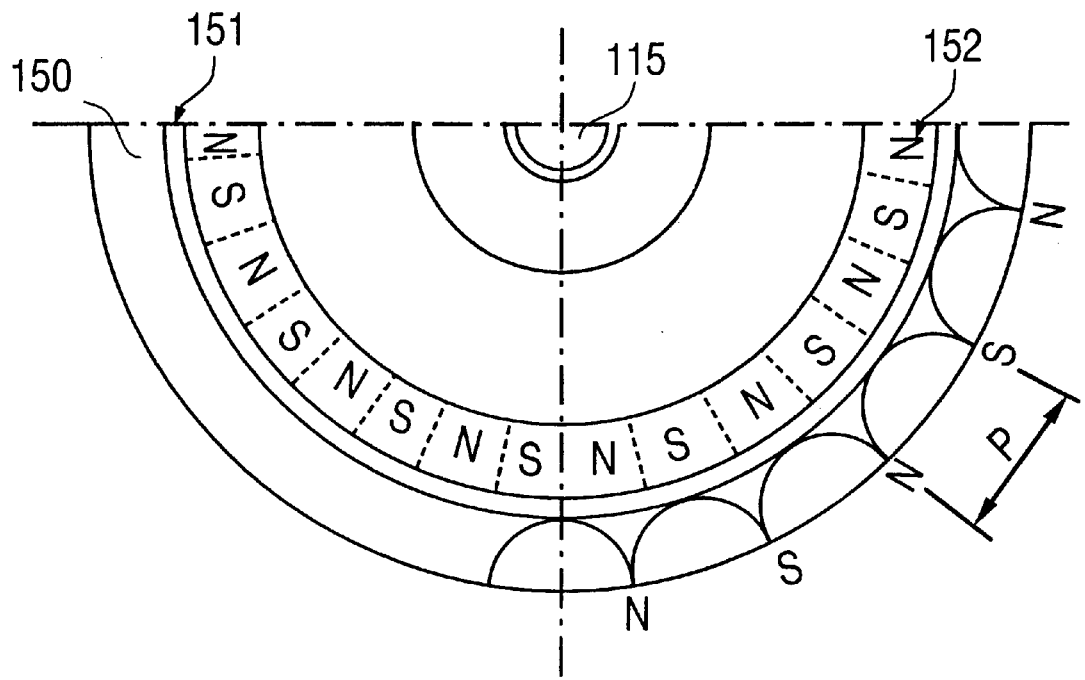
FIG. 3B is a bottom view of the rotor assembly of the present invention.

FIG. 3A is a sectional view showing a structure of the rotor assembly 114, and FIG. 3B is a bottom view of the rotor assembly 114. The rotor assembly 114, as described above, has in its center the revolving shaft 115 as the center of rotation. The rotor assembly 114 is formed by molding with a plastic magnet. On the concentric, outer circumference of the rotor assembly 114, there are disposed field magnets 150, which are, integral with a shield ring 151, and are made of a soft magnetic material serving also as a back yoke and disposed on the inner circumference, using an adhesive or the like. Alternatively field magnets 150 and shield ring 151 are fixed together with the revolving shaft 115 by molding with a plastic magnet. On the bottom end face of the plastic magnet of the rotor assembly 114 located on the side of the inner circumference of the shield ring 151, there is provided the index generating magnetized portion 152, and, on the side just above it, there is disposed a back yoke 154. This can also be molded at the same time as the shield ring 151 is molded.

Although detailed description of the back yoke 154 is omitted here because functions of same are well-known; this is an important element to improve the magnetic efficiency. However, whether this should be employed or not may be suitably decided by compromise between the required performance and the cost. On the opposite end face, there is disposed the magnetized portion 153 magnetized for attracting the information recording disk.

The index generating magnetized portion 152 is set to be weaker than the field magnets 150 so as not to affect the field magnetization. Moreover, when the outer diameter of the field magnet is represented by D and the magnetization pitch of the field magnets is represented by P, the external diameter d of the index generating magnetized portion 152 is set to be (D−P)≧d. This is for restraining the adverse effect of the index generating magnetized portion 152 on the field magnet and also suppressing noises to be superposed on the output for the index generation. Further, as to the position in the circumferential direction, it is magnetized in a precisely determined position relative to the position of the drive pin 117 for driving the magnetic recording disk disposed in the magnetized portion 153 for attraction. This method is effective for maintaining a good torque characteristic, preventing occurrence of uneven rotation, and keeping precision in indexing timing.

Figure 4:
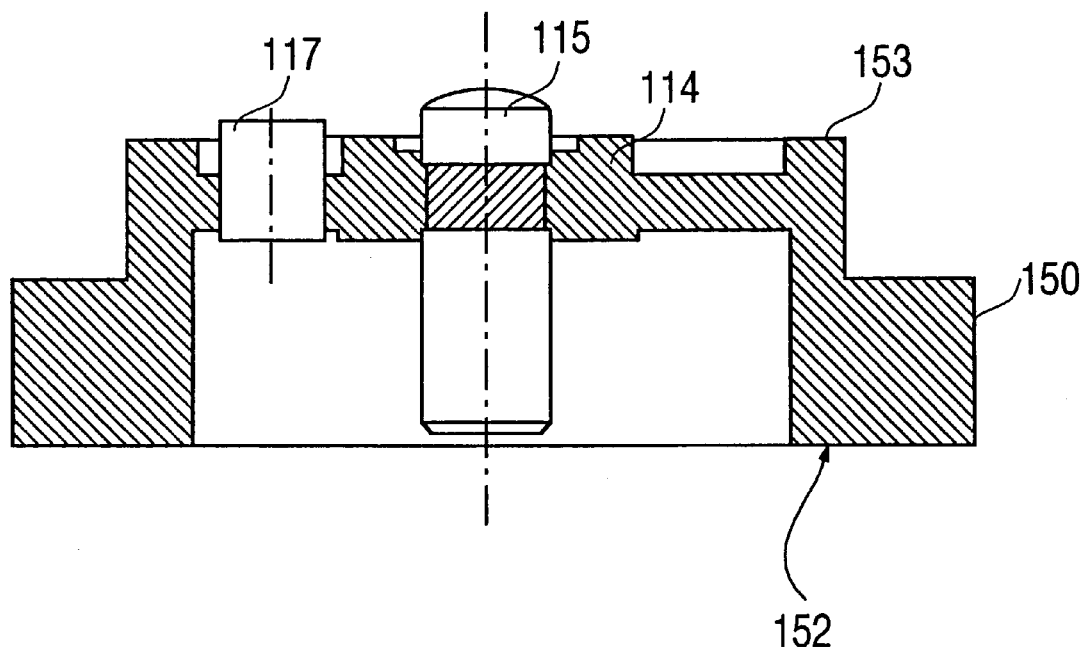
FIG. 4 is a cross sectional view of the rotor assembly of another embodiment of the present invention.

FIG. 4 shows another embodiment of the rotor assembly 114, in which the field magnet 150 and two other elements, i.e., the attracting magnet and the index generating magnet, are formed of the same material. By such a design, the number of component parts can be decreased and the fabrication process can be shortened, and, hence, further cost reduction can be attained.

Figure 5:
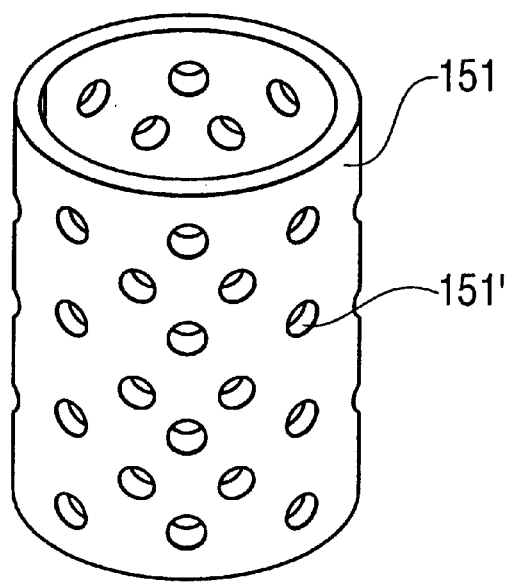
FIG. 5 is a perspective view of a shielded ring of an embodiment of the present invention.

FIG. 5 is a perspective view showing an example of the structure of a shield ring 151, in which holes 151 for mold fixing are suitably positioned in view of the shield effect and the back yoke effect. The use of punching metal or the like is also effective.

Figure 6A:
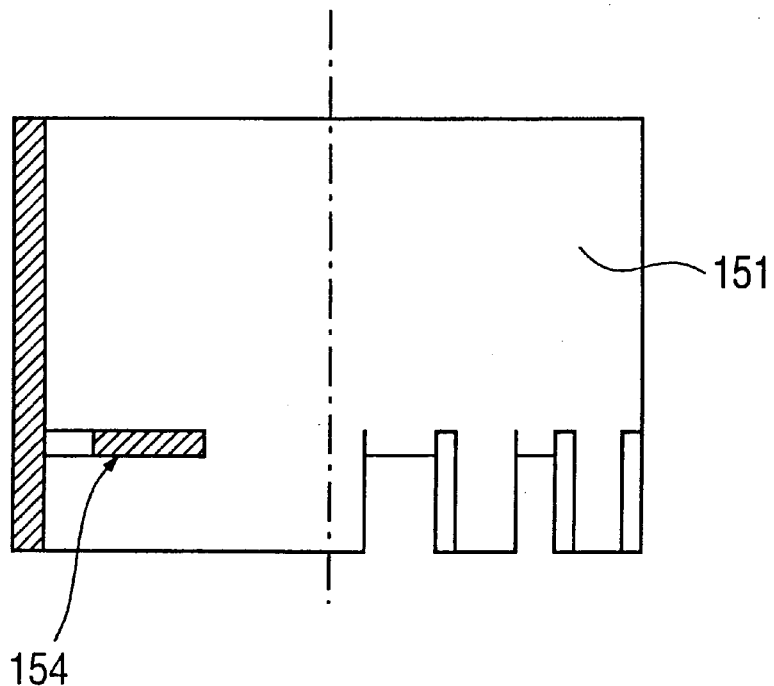
FIG. 6a is a partial cross-sectional front view and FIG. 6b is a top view of a shielded ring of another embodiment of the present invention.
Figure 6B:
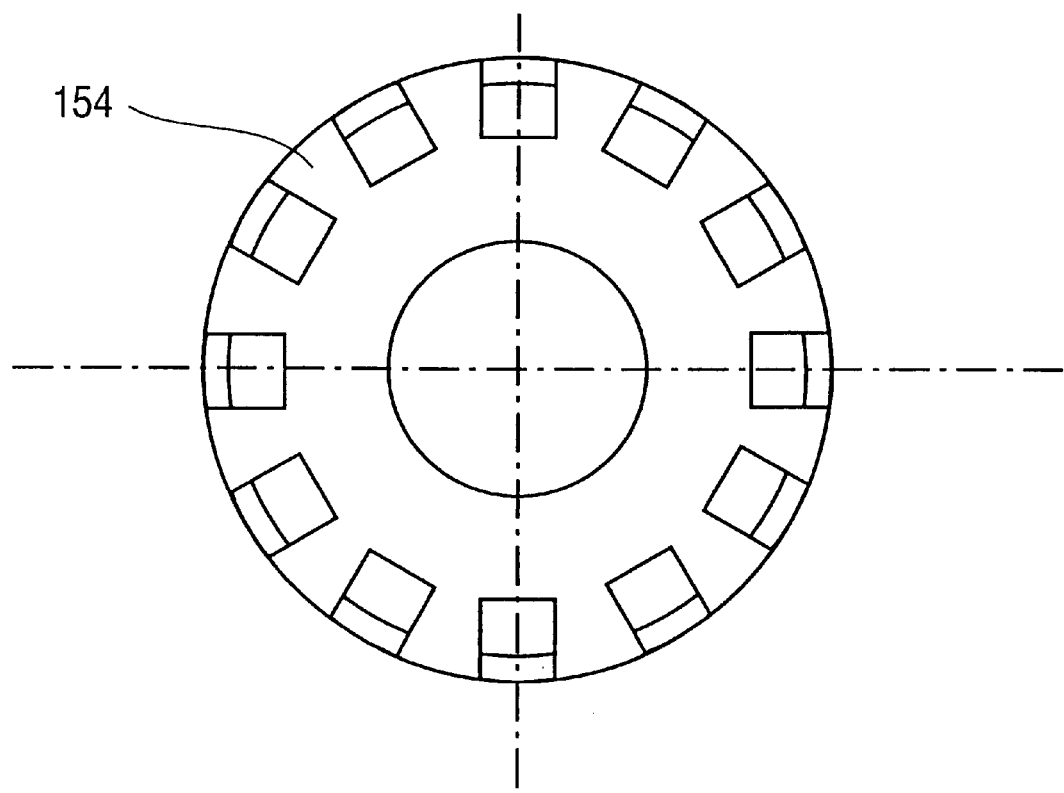
Figure 7:
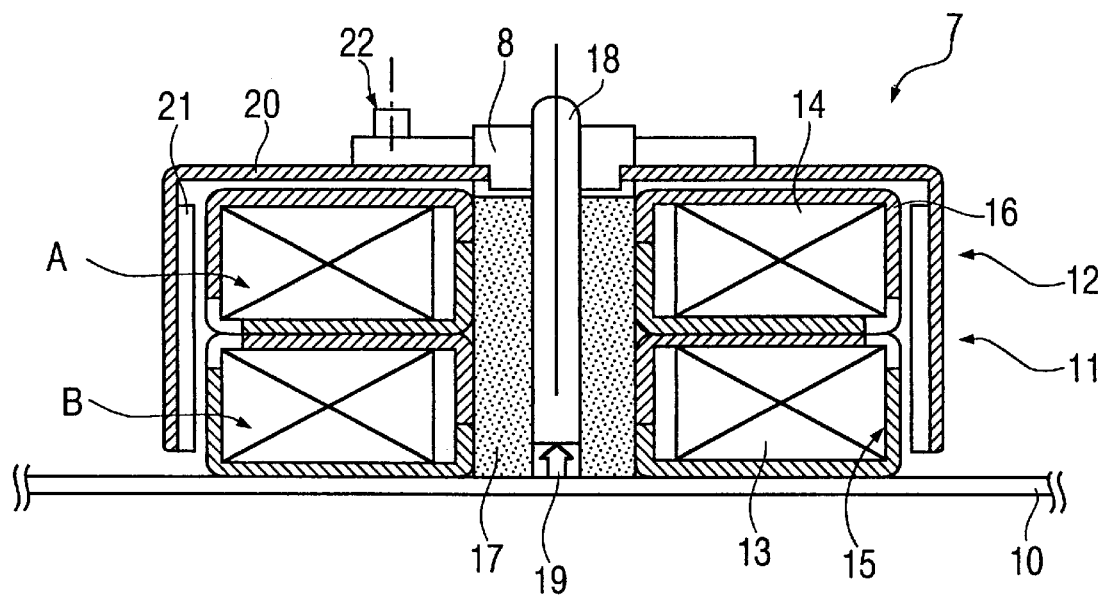
FIG. 7 is a cross sectional view of an outer rotor type stepping motor according to the prior art.

FIG. 6a is a partial cross-sectional drawing and FIG. 6b is a top view of another embodiment of the shield ring, in which a shield ring and a back yoke for the index generating magnet are integrally formed. By such a design, the number of component parts can be decreased and workability can be improved because of easier handling. When cost minimization is preferred at a sacrifice of a certain degree of performance, the shield ring may be eliminated. However, in such a case, the provision of the index generating magnetization within the range of the above described size of magnetization, (D−P)>d, that will not affect the field magnet 150 gives good results with the influence of noises reduced. By structuring the rotor as described above, uneven rotation of the claw-pole stepping motor can be suppressed and a motor with decreased surface deviation and decreased magnetic flux leakage can be provided and, thus, it can be employed as a spindle motor for FDD.

The invention, in a stepping motor having a plurality of stators disposed one above another in the direction of the revolving shaft and having these stators excited by magnetizing currents with different phases, is provided, for the rotor, with a magnet for generating an attractive force to press same against the bearing portion in the axial direction and provided, at a portion of the stator facing the magnetic recording disk, with a magnet for attracting the magnetic recording disk. Accordingly, it is possible to employ claw-pole stepping motors which can be fabricated at a low cost as spindle motors for a variety of storage devices, which fulfill the requirements of the motors of a decrease in both vibration in the axial direction as well as forming leakage of magnetic flux and high precision.

Although certain preferred embodiments have been shown and described, it should be understood that many changes and modifications may be made therein without departing from the scope of the appended claims.

What we claim is:

1. A claw-pole stepping motor comprising:
a base formed of soft magnetic material;
a stator assembly of stacked plural stators supported by the base, said plural stators being individually excited;
a bearing connected to the base and being concentrically disposed with the stator assembly; and
a rotor assembly rotatable supported on the bearing, above the base, via a shaft, and having
   (a) field magnets thereon opposed to the stator assembly,
   (b) a magnetized portion, which is an index generating magnet positioned radially inside and integral with the field magnets of the rotor, said magnetized portion having a magnetic strength less than a magnetic strength of the field magnets, to be attracted to the base below the rotor assembly, and thereby reduce vibrations in the motor, and
   (c) a shield ring positioned between the field magnets and the magnetized portion for preventing flux from leaking from the stator to the shaft,
wherein said field magnets and said magnetized portion are integrally molded together as a single plastic magnet.

2. The motor according to claim 1, wherein the shaft is fixed to said rotor assembly by plastic molding.

3. The motor according to claim 1, wherein said shield ring is a cylinder having holes and is fixed to the field magnets and magnetized portion by plastic molding.

4. A claw-pole stepping motor, comprising:
a base formed of soft magnetic material;
a stator assembly of stacked plural stators supported by the base, said plural stators being individually excited;
a bearing connected to the base and being concentrically disposed with the stator assembly;
a rotor assembly rotatably supported on the bearing, above the base, via a shaft, and having
   (a) field magnets thereon opposed to the stator assembly,
   (b) a magnetized portion, which is an index generating magnet positioned radially inside and integral with the field magnets of the rotor, said magnetized portion having a magnetic strength less than a magnetic strength of the field magnets, to be attracted to the base below the rotor assembly, and thereby reduce vibrations in the motor, and
   (c) a shield ring having a back yoke positioned between the field magnets and the magnetized portion serving as a back yoke of the field magnets and preventing flux from leaking from the stator to the shaft; and
a shield plate covering the stator assembly and the field magnets of the rotor assembly wherein said field magnets and said magnetized portion are intrgrally molded together as a single plastic magnet.

5. A claw-pole stepping motor, comprising:
a base formed of soft magnetic material;
a stator assembly of stacked plural stators supported by the base, said plural stators being individually excited;
a bearing connected to the base and being concentrically disposed with the stator assembly;
a rotor assembly rotatably supported on the bearing, above the base, via a shaft, and having
   (a) field magnets thereon opposed to the stator assembly,
   (b) a magnetized portion, which is an index generating magnet positioned radially inside and integral with the field magnets of the rotor, said magnetized portion having a magnetic strength less than a magnetic strength of the field magnets, to be attracted to the base below the rotor assembly, and thereby reduce vibrations in the motor, and
   (c) a shield ring having a back yoke positioned between the field magnets and the magnetized portion serving as a back yoke of the field magnets and preventing flux from leaking from the stator to the shaft; and
a shield plate covering the stator assembly and the field magnets of the rotor assembly.
wherein said field magnets and said magnetized portion are integrally molded as a single plastic magnet, and
wherein said shield ring is fixed to the field magnets and the index generating magnet by plastic molding.

6. The motor according to claim 4, wherein the shaft is fixed to said rotor assembly by plastic molding.

7. The motor according to claim 4, wherein said shield ring is a cylinder having holes and is fixed to the field magnets and the magnetized portion by plastic molding.

8. A claw-pole stepping motor, comprising:
a base formed of soft magnetic material;
a stator assembly of stacked plural stators supported by the base, said plural stators being individually excited;
a bearing connected to the base and being concentrically disposed with the stator assembly;
a rotor assembly rotatably supported on the bearing, above the base, via a shaft, and having
   (a) field magnets thereon opposed to the stator assembly,
   (b) a first magnetized portion positioned radially inside and integral with the field magnets, said first magnetized portion having a magnetic strength less than a magnetic strength of the field magnets, to be attracted to the base below the rotor assembly, and thereby reduce vibrations in the motor, and
   (c) a second magnetized portion above the first magnetized portion for attracting a magnetic recording disk,
   (d) a shield ring having a back yoke positioned between the field magnets and the first magnetized portion serving as a back yoke of the field magnets and preventing flux from leaking from the stator to the shaft; and
a shield plate covering the stator assembly and the field magnets of the rotor assembly,
wherein said first magnetized portion is an index generating magnet wherein said field magnets and said magnetized portion are intrgrally molded together as a single plastic magnet.

9. A claw-pole stepping motor, comprising:
a base formed of soft magnetic material;
a stator assembly of stacked plural stators supported by the base, said plural stators being individually excited;
a bearing connected to the base and being concentrically disposed with the stator assembly;
a rotor assembly rotatable supported on the bearing, above the base, via a shaft, and having
   (a) field magnets thereon opposed to the stator assembly,
   (b) a first magnetized portion positioned radially inside and integral with the field magnets, said first magnetized portion being an index generating magnet and having a magnetic strength less than a magnetic strength of the field magnets, to be attracted to the base below the rotor assembly, and thereby reduce vibrations in the motor, (c) a second magnetized portion above the first magnetized portion for attracting a magnetic recording disk, and (d) a shield ring having a back yoke positioned between the field magnets and the first magnetized portion serving as a back yoke of the field magnets and preventing flux from leaking from the stator to the shaft; and a shield plate covering the stator assembly and the field magnets of the rotor assembly, wherein said field magnets and said first and second magnetized portions are integrally molded as a single plastic magnet.

10. The motor according to claim 8, wherein the shaft is fixed to said rotor assembly by plastic molding.

11. The motor according to claim 8, wherein said shield ring is a cylinder having holes and is fixed to the field magnets and first magnetized portion by plastic molding.

* * * * *

UNITED STATES PATENT AND TRADEMARK OFFICE
CERTIFICATE OF CORRECTION

PATENT NO.: 6,133,655
DATED : October 17, 2000
INVENTOR(S): Suzuki et al.

It is certified that errors appear in the above-identified patent and that said Letters Patent is hereby corrected as shown below:

Column 3,
    line 19, delete "; and".*

Column 4,
    line 32, change"151" (second occurrence) to --151'--;
    line 65, change "as well as forming" to --and--; and
    line 66, change "and" to --as well as having--.

Column 5,
    line 12, change "rotatable" to --rotatably--; and
    line 57, change "intrgrally" to --integrally--.

Column 6,
    line 12, change "voke" to --yoke--;
    line 15, change "." to --,--;
    line 53, change "intrgrally" to --integrally--; and
    line 62, change "rotatable" to --rotatably--.

Signed and Sealed this

Fifteenth Day of May, 2001

Attest:

NICHOLAS P. GODICI

*Attesting Officer*  *Acting Director of the United States Patent and Trademark Office*